United States Patent
Hu

(10) Patent No.: US 10,461,469 B2
(45) Date of Patent: Oct. 29, 2019

(54) PLUG AND SOCKET ARRANGEMENT FOR AN INFORMATION ROBOT APPARATUS

(71) Applicant: Qiaoling Hu, Taizhou (CN)

(72) Inventor: Qiaoling Hu, Taizhou (CN)

(73) Assignee: Wenling Haoda Electric Appliance Co., Ltd., Wenling, Taizhou, Zhejiang Province (CN)

( * ) Notice: Subject to any disclaimer, the term of this patent is extended or adjusted under 35 U.S.C. 154(b) by 0 days.

(21) Appl. No.: 16/236,363

(22) Filed: Dec. 29, 2018

(65) Prior Publication Data

US 2019/0140396 A1 May 9, 2019

(30) Foreign Application Priority Data

May 10, 2018 (CN) .......................... 2018 1 4429512

(51) Int. Cl.
*H01R 13/20* (2006.01)
*H01R 13/629* (2006.01)
(Continued)

(52) U.S. Cl.
CPC ........ *H01R 13/62922* (2013.01); *B25J 19/06* (2013.01); *F16D 3/06* (2013.01); *F16H 7/02* (2013.01); *F16H 25/20* (2013.01); *H01R 13/20* (2013.01); *H01R 13/6675* (2013.01); *F16H 2025/2081* (2013.01);
(Continued)

(58) Field of Classification Search
CPC .... H01R 13/20; H01R 13/187; H01R 13/447; H01R 13/6395
See application file for complete search history.

(56) References Cited

U.S. PATENT DOCUMENTS 8,616,904 B1 * 12/2013 Martin ................... H01R 13/20
439/188
9,431,763 B2 * 8/2016 Chapel ................... H01R 13/20
(Continued)

FOREIGN PATENT DOCUMENTS

CN 106785669 5/2017
CN 107026366 8/2017
(Continued)

OTHER PUBLICATIONS

First Office Action for Chinese Counterpart Application 201810442951.2 dated Oct. 30, 2018.
(Continued)

*Primary Examiner* — Tho D Ta

(57) ABSTRACT

This invention discloses an information robot apparatus, comprising a robot body, a plug body, a socket body, a plug groove arranged in one end face of the socket body, a first sliding cavity communicated with the plug groove, a second sliding cavity communicated with the extending tail end of the first sliding cavity, a third sliding cavity arranged in the socket body. Wherein the tail end of the bottom of a rotating shaft extends into the third sliding cavity and is fixedly connected with the tail end of the top of an adjusting threaded rod. Therefore, it is convenient to quickly plug in and take out after disconnection with power; meanwhile, the automatic control of the power supply and the disconnection with power before taking out can be realized, so that the operation safety is greatly improved.

1 Claim, 2 Drawing Sheets

(51) Int. Cl.
 *B25J 19/06* (2006.01)
 *F16D 3/06* (2006.01)
 *F16H 7/02* (2006.01)
 *F16H 25/20* (2006.01)
 *H01R 13/66* (2006.01)
 H01R 13/639 (2006.01)
 H01R 13/187 (2006.01)
 H01R 13/447 (2006.01)

(52) U.S. Cl.
 CPC .... *F16H 2025/2096* (2013.01); *H01R 13/187* (2013.01); *H01R 13/447* (2013.01); *H01R 13/639* (2013.01); *H01R 13/6395* (2013.01)

(56) References Cited

U.S. PATENT DOCUMENTS 9,502,808 B1 * 11/2016 Baldwin ................ H01R 35/04
10,153,590 B2 * 12/2018 Huang ................ H01R 13/652

FOREIGN PATENT DOCUMENTS

| CN | 107465065 | 12/2017 |
| EP | 1956686 | 8/2008 |

OTHER PUBLICATIONS

Notification of Grant for Chinese Counterpart Application 201810442951.2 dated Nov. 16, 2018.

* cited by examiner

PLUG AND SOCKET ARRANGEMENT FOR AN INFORMATION ROBOT APPARATUS

CROSS-REFERENCES TO RELATED APPLICATIONS

The present application claims priority from Chinese application No. 2018104429512 filed on May 10, 2018 which is hereby incorporated by reference in its entirety.

TECHNICAL FIELD

The invention relates to the technical field of robot equipments, in particular to an information robot apparatus.

BACKGROUND OF THE INVENTIONS

With the continuous improvement of the technology, the processing procedures in a lot of manufacturing industry are often completed by robots instead of manual operation. Robots are required to be electrically connected in the using process. Traditionally, plug portions connected with robots are directly plugged in the sockets, which is convenient, but electric wires between plug portions and robots exist. When plugged in, electric wires are easily kicked because they are exposed and people may also trip over them easily, so plugs fall out or are in poor contact with the sockets, resulting in big security risks; meanwhile, sudden disconnection with the power can even directly cause the burning of robots, so that an information robot apparatus which can be quickly connected and is high in connection stability is needed.

BRIEF SUMMARY OF THE INVENTION

The purpose of the invention is to provide an information robot apparatus so as to overcome the problems existing in the prior art.

An information robot apparatus according to the invention comprises a robot body, a plug body and a socket body, a plug groove arranged in one end face of the socket body, a first sliding cavity extending upwards and downwards communicated with the plug groove, a second sliding cavity which extends to two ends communicated with the extending tail end of the bottom of the first sliding cavity, a third sliding cavity which extends upwards and downwards arranged in the socket body on one side of the first sliding cavity, wherein the extending tail end of the bottom of the third sliding cavity is communicated with the top of extending section of one end of the second sliding cavity, a transmission cavity extending towards two ends arranged in the socket body on the upper side of the first sliding cavity, wherein the extending section of one side of the transmission cavity is located at the top corresponding position of the third sliding cavity, a first sliding block arranged in the first sliding cavity in a sliding fit mode, a second sliding block arranged in the second sliding cavity in a sliding fit mode, wherein a first through slot is arranged in the first sliding block, a first inclined plane block fixedly arranged on the inner top wall of the first through slot, a second inclined plane block fixedly arranged at the tail end of the bottom of the first sliding block, a driving motor fixedly arranged on the end face of the top wall of the first sliding block, an inner spline sleeve in rotational engagement with the portion, between the transmission cavity and the first sliding cavity, of the socket body, wherein a first pulley extending into the transmission cavity is fixedly arranged at the tail end of the top wall of the inner spline sleeve, an outer spline shaft extending downwards in sliding fit connection with the inner spline sleeve, wherein the extending tail end of the bottom of the outer spline shaft extends into the first sliding cavity and is in power connection with the top end of the driving motor, a first spring annularly arranged around the outer spline shaft in the first sliding cavity, wherein the top end surface of the second sliding block is internally provided with an inclined plane groove held against and connected with the second inclined plane block, a second through slot which is used for being communicated with the third sliding cavity arranged in the second sliding block and located at one side of the inclined plane groove, a third inclined plane block fixedly arranged on the inner wall of one side of the second through slot, wherein a second spring pushes against and connects with one side of the second sliding block in the second sliding cavity, a third sliding block arranged in the third sliding cavity in a sliding fit mode, wherein an adjusting threaded rod extending upwards is in threaded fit connection with the third sliding block, a fourth inclined plane block fixedly arranged at the tail end of the bottom of the third sliding block, a rotating shaft in rotational engagement with the portion, between the transmission cavity and the third sliding cavity, of the socket body, wherein a second pulley extending into the transmission cavity is fixedly arranged at the tail end of the top of the rotating shaft, a driving belt arranged between the second pulley and the first pulley, wherein the tail end of the bottom of the rotating shaft extends into the third sliding cavity and is fixedly connected with the tail end of the top of the adjusting threaded rod in a matched mode.

For the further technical solutions, a guide sliding groove is communicated in the inner wall of one side of the third sliding cavity, wherein a guide sliding block which is fixedly connected with the third sliding block is in sliding fit connection with the interior of the guide sliding groove, and the top end face of the guide sliding block is fixedly provided with a conductive block, wherein a power supply groove is arranged in the inner top wall of the guide sliding groove opposite to the top of the conductive block.

For the further technical solutions, a conductive groove is arranged in the inner wall of one side of the plug groove, and the conductive groove is electrically connected with the conductive block.

For the further technical solutions, a wire electrically connected with the robot body is arranged on one side of the plug body, and the other side of the plug body is provided with a plug column which is used to plug and connect with the plug groove, and an inclined plane top pressing block is arranged on the side, away from the plug body, of the plug column, wherein a plug pin used to plug in the conductive groove is fixedly arranged on the end surface, away from the plug column, of the inclined plane top pressing block, and a lock recess connected with the first inclined plane block in a matched mode is arranged in the top end surface of the plug column.

DETAILED DESCRIPTION OF THE INVENTION

The present invention will be described in detail in the following in combination with FIG. 1 to FIG. 3.

Figure 1:
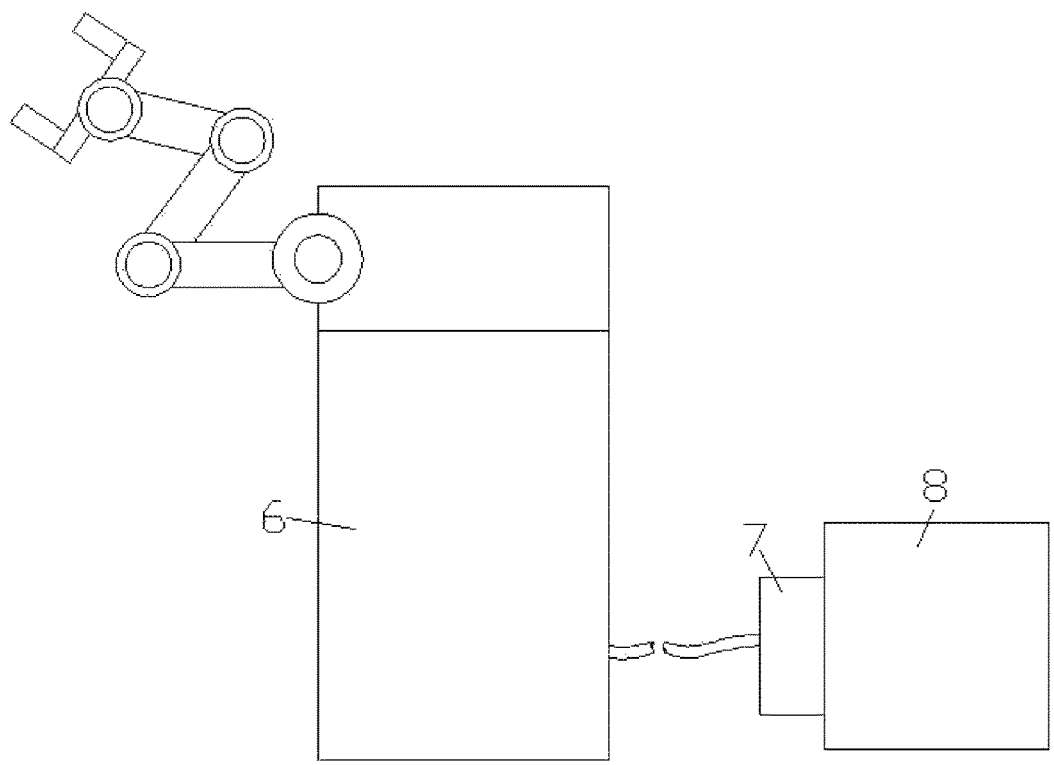
FIG. 1 is a schematic diagram depicting an overall configuration outside the information robot device in this invention.
Figure 2:
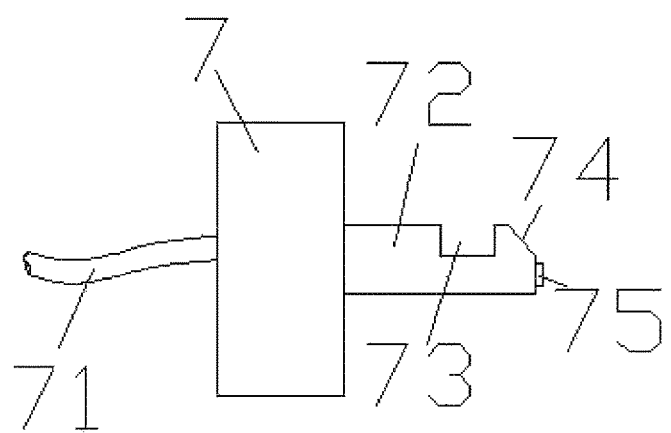
FIG. 2 is the overall structural diagram of the plug body in this invention.
Figure 3:
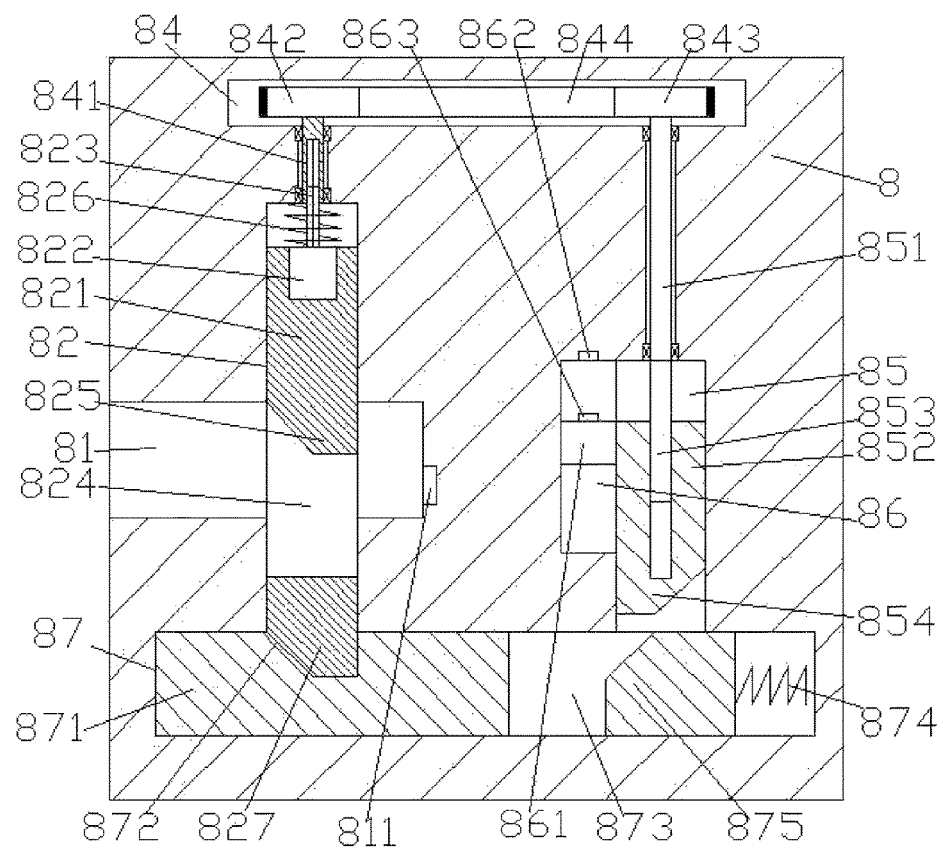
FIG. 3 is the overall structural diagram of the socket body in this invention.

Referring to FIG. 1 to FIG. 3, an information robot apparatus according to the embodiments of the invention comprises a robot body 6, a plug body 7, a socket body 8, a plug groove 81 arranged in one end face of the socket body 8, a first sliding cavity 82 extending upwards and downwards communicated with the plug groove 81, a second sliding cavity 87 which extends to two ends communicated with the extending tail end of the bottom of the first sliding cavity 82, a third sliding cavity 85 which extends upwards and downwards arranged in the socket body 8 on one side of the first sliding cavity 82, wherein the extending tail end of the bottom of the third sliding cavity 85 is communicated with the top of extending section of one end of the second sliding cavity 87, a transmission cavity 84 extending towards two ends arranged in the socket body 8 on the upper side of the first sliding cavity 82, wherein the extending section of one side of the transmission cavity 84 is located at the top corresponding position of the third sliding cavity 85, a first sliding block 821 arranged in the first sliding cavity 82 in a sliding fit mode, a second sliding block 871 arranged in the second sliding cavity 87 in a sliding fit mode, wherein a first through slot 824 is arranged in the first sliding block 821, a first inclined plane block 825 fixedly arranged on the inner top wall of the first through slot 824, a second inclined plane block 827 fixedly arranged at the tail end of the bottom of the first sliding block 821, a driving motor 822 fixedly arranged on the end face of the top wall of the first sliding block 821, an inner spline sleeve 841 in rotational engagement with the portion, between the transmission cavity 84 and the first sliding cavity 82, of the socket body 8, wherein a first pulley 842 extending into the transmission cavity 84 is fixedly arranged at the tail end of the top wall of the inner spline sleeve 841, an outer spline shaft 823 extending downwards in sliding fit connection with the inner spline sleeve 841, wherein the extending tail end of the bottom of the outer spline shaft 823 extends into the first sliding cavity 82 and is in power connection with the top end of the driving motor 822, a first spring 826 annularly arranged around the outer spline shaft 823 in the first sliding cavity 82, wherein the top end surface of the second sliding block 871 is internally provided with an inclined plane groove 872 held against and connected with the second inclined plane block 827, a second through slot 873 which is used for being communicated with the third sliding cavity 85 arranged in the second sliding block 871 and located at one side of the inclined plane groove 872, a third inclined plane block 875 fixedly arranged on the inner wall of one side of the second through slot 873, wherein a second spring 874 pushes against and connects with one side of the second sliding block 871 in the inner wall of the second sliding cavity 87, a third sliding block 852 arranged in the third sliding cavity 85 in a sliding fit mode, wherein an adjusting threaded rod 853 extending upwards is in threaded fit connection with the third sliding block 852, a fourth inclined plane block 854 fixedly arranged at the tail end of the bottom of the third sliding block 852, a rotating shaft 851 in rotational engagement with the portion, between the transmission cavity 84 and the third sliding cavity 85, of the socket body 8, wherein a second pulley 843 extending into the transmission cavity 84 is fixedly arranged at the tail end of the top of the rotating shaft 851, a driving belt 844 arranged between the second pulley 843 and the first pulley 842, wherein the tail end of the bottom of the rotating shaft 851 extends into the third sliding cavity 85 and is fixedly connected with the tail end of the top of the adjusting threaded rod 853 in a matched mode.

Beneficially or as an embodiment, a guide sliding groove 86 is communicated in the inner wall of one side of the third sliding cavity 85, wherein a guide sliding block 861 which is fixedly connected with the third sliding block 852 is in sliding fit connection with the interior of the guide sliding groove 86, and the top end face of the guide sliding block 861 is fixedly provided with a conductive block 863, wherein a power supply groove 862 is arranged in the inner top wall of the guide sliding groove 86 opposite to the top of the conductive block 863, so that safe power supply connection work is realized.

Beneficially or as an embodiment, a conductive groove 811 is arranged in the inner wall of one side of the plug groove 81, and the conductive groove 811 is electrically connected with the conductive block 863, so that the stable transmission work of power supply can be realized.

Beneficially or as an embodiment, a wire 71 electrically connected with the robot body 6 is arranged on one side of the plug body 7, and the other side of the plug body 7 is provided with a plug column 72 which is used to plug and connect with the plug groove 81, and an inclined plane top pressing block 74 is arranged on the side, away from the plug body 7, of the plug column 72, wherein a plug pin 75 used to plug in the conductive groove 811 is fixedly arranged on the end surface, away from the plug column 72, of the inclined plane top pressing block 74, and a lock recess 73 connected with the first inclined plane block 825 in a matched mode is arranged in the top end surface of the plug column 72, so that fast and firm connection with power is to be done conveniently.

In the initial state, the second sliding block 871 is pushed by the elastic force of the second spring 874, so that the second sliding block 871 is located at the leftmost position in the second sliding cavity 87, at the moment the inclined plane groove 872 is located at the corresponding position of the bottom of the first sliding cavity 82; meanwhile, the third inclined plane block 875 on the inner wall of one side of the second through slot 873 is located at the corresponding position of the bottom of the third sliding cavity 85, and at the moment the first sliding block 821 is pushed by the elastic force of the first spring 826 to make the first sliding block 821 drive the second inclined plane block 827 to slide into the inclined plane groove 872 to the maximum degree; meanwhile, the top section of the outer spline shaft 823 and the bottom section of the inner spline sleeve 841 are in power fit connection with each other, and at the moment the guide sliding block 861 is located in the middle of the guide sliding groove 86; meanwhile, the third sliding block 852 is completely positioned in the third sliding cavity 85, and at the moment the fourth inclined plane block 854 at the tail end of the bottom of the third sliding block 852 and the third inclined plane block 875 are in a separated state; meanwhile, the conductive block 863 is enabled to be far away from the power supply groove 862.

When the connection to the power supply is needed, the plug body 7 is firstly moved to one side of the socket body 8; meanwhile, the plug column 72 which is on the plug body 7 and the plug groove 81 are opposite to each other, and at the moment the plug body 7 is moved towards one side of the socket body 8, so that the plug column 72 gradually extends into the plug groove 81 until the inclined plane top pressing block 74 holds against and slides with the first inclined plane block 825, and at the moment the first inclined plane block 825 drives the first sliding block 821 to overcome the elastic force of the first spring 826 to gradually slide toward the top of the first sliding cavity 82; meanwhile, the first sliding block 821 drives the second inclined plane block 827 to be gradually away from the inclined plane groove 872 until the end surface of the bottom of the first inclined plane block 825 is in sliding fit connection with the top end surface of the plug column 72, and at the moment the first sliding block 821 slides to the top position in the first sliding cavity 82 to the largest extent, and the plug column 72 continues to be moved to the plug groove 81 until the lock recess 73 is completely moved to the corresponding position of the bottom of the first inclined plane block 825, and at the moment the first sliding block 821 is pushed by the elastic force of the first spring 826, so that the first inclined plane block 825 completely extends into the lock recess 73; meanwhile, the second inclined plane block 827 is made to extend into the inclined plane groove 872 again; meanwhile, the plug pin 75 is completely inserted into the conductive groove 811, and then the driving motor 822 is controlled to rotate, so the driving motor 822 may drive the outer spline shaft 823 and the inner spline sleeve 841 to rotate, and the driving belt 844 and the second pulley 843 are driven to rotate through the first pulley 842 on the inner spline sleeve 841, and the second pulley 843 drives the rotating shaft 851 and the adjusting threaded rod 853 to rotate, and at the moment the adjusting threaded rod 853 drives the third sliding block 852 to slide towards the top in the third sliding cavity 85; meanwhile, the third sliding block 852 drives the guide sliding block 861 to slide towards the top of the guide sliding groove 86 until the third sliding block 852 slides to the topmost position in the third sliding cavity 85, and at the moment the third sliding block 852 drives the guide sliding block 861 to slide into the topmost position in the guide sliding groove 86; meanwhile, the conductive block 863 is driven by the guide sliding block 861 to be completely inserted into the power supply groove 862, so that automatic and safe power supply is implemented; when unlocking is needed, the driving motor 822 is controlled to rotate reversely, and then the driving motor 822 drives the adjusting threaded rod 853 to rotate reversely, and at the moment the adjusting threaded rod 853 drives the third sliding block 852 to slide towards the bottom in the third sliding cavity 85; meanwhile, the third sliding block 852 drives the conductive block 863 on the guide sliding block 861 to gradually slide away from the power supply groove 862, so that automatic disconnection with power is achieved; and the driving motor 822 continues to be controlled to drive the adjusting threaded rod 853 to rotate reversely until the third sliding block 852 drives the fourth inclined plane block 854 to extend into the second through slot 873 and the fourth inclined plane block 854 holds against and slides with the third inclined plane block 875, so that the third inclined plane block 875 drives the second sliding block 871 to overcome the elastic force of the second spring 874 to slide towards one side in the second sliding cavity 87; meanwhile, the inclined plane groove 872 holds against and slides with the second inclined plane block 827, and at the moment the first sliding block 821 is driven by the second inclined plane block 827 to slide towards the top in the first sliding cavity 82 until the first inclined plane block 825 completely slides out of the lock recess 73, and then the plug body 7 can just be taken out.

The benefits of the invention are as follows: the invention is simple in structure and easy to operate. The invention is realized by the apparatus, comprising a plug groove arranged in one end face of the socket body, a first sliding cavity extending upwards and downwards communicated with the plug groove, a second sliding cavity which extends to two ends communicated with the extending tail end of the bottom of the first sliding cavity, a third sliding cavity which extends upwards and downwards arranged in the socket body on one side of the first sliding cavity, wherein the extending tail end of the bottom of the third sliding cavity is communicated with the top of extending section of one end of the second sliding cavity, a transmission cavity extending towards two ends arranged in the socket body on the upper side of the first sliding cavity, wherein the extending section of one side of the transmission cavity is located at the top corresponding position of the third sliding cavity, a first sliding block arranged in the first sliding cavity in a sliding fit mode, a second sliding block arranged in the second sliding cavity in a sliding fit mode, wherein a first through slot is arranged in the first sliding block, a first inclined plane block fixedly arranged on the inner top wall of the first through slot, a second inclined plane block fixedly arranged at the tail end of the bottom of the first sliding block, a driving motor fixedly arranged on the end face of the top wall of the first sliding block, an inner spline sleeve in rotational engagement with the portion, between the transmission cavity and the first sliding cavity, of the socket body, wherein a first pulley extending into the transmission cavity is fixedly arranged at the tail end of the top wall of the inner spline sleeve, an outer spline shaft extending downwards in sliding fit connection with the inner spline sleeve, wherein the extending tail end of the bottom of the outer spline shaft extends into the first sliding cavity and is in power connection with the top end of the driving motor, a first spring annularly arranged around the outer spline shaft in the first sliding cavity, wherein the top end surface of the second sliding block is internally provided with an inclined plane groove held against and connected with the second inclined plane block, a second through slot which is used for being communicated with the third sliding cavity arranged in the second sliding block and located at one side of the inclined plane groove, a third inclined plane block fixedly arranged on the inner wall of one side of the second through slot, wherein a second spring pushes against and connects with one side of the second sliding block in the second sliding cavity, a third sliding block arranged in the third sliding cavity in a sliding fit mode, wherein an adjusting threaded rod extending upwards is in threaded fit connection with the third sliding block, a fourth inclined plane block fixedly arranged at the tail end of the bottom of the third sliding block, a rotating shaft in rotational engagement with the portion, between the transmission cavity and the third sliding cavity, of the socket body, wherein a second pulley extending into the transmission cavity is fixedly arranged at the tail end of the top of the rotating shaft, a driving belt arranged between the second pulley and the first pulley, wherein the tail end of the bottom of the rotating shaft extends into the third sliding cavity and is fixedly connected with the tail end of the top of the adjusting threaded rod in a matched mode, therefore, it is convenient to quickly plug in and take out after disconnection with power; meanwhile, the automatic control of the connection work of power supply after insertion and the disconnection with power before taking out can be realized, so that the operation safety of workers is greatly improved.

Persons skilled in the art should understand that, the invention will be subject to modification of the above-mentioned embodiments based on its intention and conception, which will also fall into the claimed protection extent of this invention. The claimed protection extent of the invention shall be determined with reference to the appended claims

The invention claimed is:

1. A plug and socket arrangement for an information robot apparatus, comprising
a robot body;
a plug body;
a socket body;
a plug groove arranged in one end face of the socket body;
a wire electrically connected with the robot body is arranged on one side of the plug body, and the other side of the plug body is provided with a plug column which is used to plug and connect with the plug groove;
an inclined plane top pressing block is arranged on the side, away from the plug body, of the plug column;
wherein a plug pin is fixedly arranged on an end surface thereof, away from the plug column, of the inclined plane top pressing block;
a lock recess is arranged in a top end surface of the plug column;
a first sliding cavity extending upwards and downwards communicated with the plug groove;
a second sliding cavity which extends to two ends thereof communicated with a bottom extending tail end of the first sliding cavity;
a third sliding cavity which extends upwards and downwards arranged in the socket body on one side of the first sliding cavity;
wherein a bottom extending tail end of the third sliding cavity is communicated with a top extending section of one end of the second sliding cavity;
a transmission cavity extending towards two ends thereof arranged in the socket body on an upper side of the first sliding cavity;
wherein an extending section of one side of the transmission cavity is located at a top corresponding position of the third sliding cavity;
a first sliding block arranged in the first sliding cavity in a sliding fit mode;
a second sliding block arranged in the second sliding cavity in a sliding fit mode;
wherein a first through slot is arranged in the first sliding block;
a first inclined plane block fixedly arranged on an inner top wall of the first through slot for connecting with the lock recess of the plug column in match mode;
a second inclined plane block fixedly arranged at a bottom tail end of the first sliding block;
a driving motor fixedly arranged on the end face of a top wall of the first sliding block;
an inner spline sleeve in rotational engagement with the transmission cavity and the first sliding cavity, of the socket body;
wherein a first pulley extending into the transmission cavity is fixedly arranged at a top wall tail end of the inner spline sleeve;
an outer spline shaft extending downwards in sliding fit connection with the inner spline sleeve;
wherein a bottom extending tail end of the outer spline shaft extends into the first sliding cavity and is in power connection with a top end of the driving motor;
a first spring annularly arranged around the outer spline shaft in the first sliding cavity;
wherein a top end surface of the second sliding block is internally provided with an inclined plane groove held against and connected with the second inclined plane block;
a second through slot which is used for being communicated with the third sliding cavity arranged in the second sliding block and located at one side of the inclined plane groove;
a third inclined plane block fixedly arranged on an inner wall of one side of the second through slot;
wherein a second spring pushes against and connects with one side of the second sliding block in the second sliding cavity;
a third sliding block arranged in the third sliding cavity in a sliding fit mode;
wherein an adjusting threaded rod extending upwards is in threaded fit connection with the third sliding block;
a fourth inclined plane block fixedly arranged at a bottom tail end of the third sliding block;
a rotating shaft in rotational engagement with the transmission cavity and the third sliding cavity, of the socket body;
wherein a second pulley extending into the transmission cavity is fixedly arranged at a top tail end of the rotating shaft;
a driving belt arranged between the second pulley and the first pulley;
wherein a bottom tail end of the rotating shaft extends into the third sliding cavity and is fixedly connected with a top tail end of the adjusting threaded rod in a matched mode;
the plug body is firstly moved to one side of the socket body to make the plug column and the plug groove are opposite to each other;
the plug body is moved towards one side of the socket body so the plug column gradually extends into the plug groove until the inclined plane top pressing block holds against and slides with the first inclined plane block, so that the first inclined plane block drives the first sliding block to overcome the elastic force of the first spring to gradually slide toward a top of the first sliding cavity;
a guide sliding groove is communicated in an inner wall of one side of the third sliding cavity;
wherein a guide sliding block which is fixedly connected with the third sliding block is in sliding fit connection with an interior of the guide sliding groove, and a top end face of the guide sliding block is fixedly provided with a conductive block;
wherein a power supply groove is arranged in an inner top wall of the guide sliding groove opposite to the top of the conductive block;
the conductive block is driven by the guide sliding block to be completely inserted into the power supply groove so automatic and safe power supply is implemented;
a conductive groove is arranged in an inner wall of one side of the plug groove for receiving the plug pin, and the conductive groove is electrically connected with the conductive block;
the driving motor is controlled to drive the adjusting threaded rod to rotate reversely until the third sliding block drives the fourth inclined plane block to extend into the second through slot and the fourth inclined plane block holds against and slides with the third inclined plane block, so that the third inclined plane block drives the second sliding block to overcome the elastic force of the second spring to slide towards one side in the second sliding cavity; meanwhile, the inclined plane groove holds against and slides with the second inclined plane block, so the first sliding block is driven by the second inclined plane block to slide towards the top in the first sliding cavity until the first inclined plane block completely slides out of the lock recess, and it is convenient to take out the plug body.

* * * * *